United States Patent
Dilley, Jr. et al.

(10) Patent No.: US 7,313,560 B2
(45) Date of Patent: Dec. 25, 2007

(54) DATA MIGRATION SYSTEM AND METHOD

(75) Inventors: Reginald James Dilley, Jr., San Jose, CA (US); Mark A. Keimig, Greensboro, NC (US); Lynn N. Nagel, Houston, TX (US); Walter Orb, Westhofen (DE)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 10/314,583

(22) Filed: Dec. 9, 2002

(65) Prior Publication Data

US 2004/0111726 A1    Jun. 10, 2004

(51) Int. Cl.
*G06F 7/00* (2006.01)
*G06F 12/00* (2006.01)
*G06F 9/46* (2006.01)

(52) U.S. Cl. .................. 707/100; 707/204; 718/102

(58) Field of Classification Search ............ 718/102; 107/204–205; 707/100, 204
See application file for complete search history.

(56) References Cited

U.S. PATENT DOCUMENTS

| | | |
|---|---|---|
| 5,150,472 A | 9/1992 | Blank et al. |
| 5,276,867 A | 1/1994 | Kenley et al. |
| 5,313,631 A | 5/1994 | Kao |
| 5,367,698 A | 11/1994 | Webber et al. |
| 5,678,044 A | 10/1997 | Pastilha et al. |
| 6,145,066 A * | 11/2000 | Atkin ..................... 711/165 |
| 6,151,608 A * | 11/2000 | Abrams ................... 707/204 |
| 6,308,178 B1 * | 10/2001 | Chang et al. ............ 707/100 |
| 2003/0145022 A1 * | 7/2003 | Dingley .................. 707/204 |
| 2005/0246390 A1 * | 11/2005 | House et al. ............ 707/200 |

FOREIGN PATENT DOCUMENTS

| | | |
|---|---|---|
| CA | 2313934 | 1/2001 |
| WO | WO 02/29523 A2 | 4/2002 |

OTHER PUBLICATIONS

T. Hara et al., "Database and Expert Systems Applications", 11th International Conference, DEXA 2000, London, UK, Sep. 4-8, 2000 Proceedings, vol. 1873, pp. 78-91.
T. Hara et al., "A Scheduling of Database Migration in Wide-Area Networks", Systems and Computers in Japan, Sep. 2000, vol. 31, No. 10, pp. 10-19.
T. Hara et al., "A Scheduling Method of Database Migration in Wide Area Networks", Dec. 1999, The Transactions of the Institute of Electonics, Information and Communication Engineers D-I, vol. J82-D-I, No. 12, pp. 1369-1378.
INSPEC: Hara et al., 2 Articles; PY: 2000 and 1 Article; PY: 1999 pp. 1-4.

* cited by examiner

*Primary Examiner*—Meng-Al T. An
*Assistant Examiner*—Camquy Truong
(74) *Attorney, Agent, or Firm*—Douglas A. Lashmit; Hoffman, Warnick & D'Alessandro LLC

(57) ABSTRACT

A system and method for migrating data from a source system to a target system using a heterogeneous set of migration systems. The described system comprises: a plurality of migration systems, wherein each migration system includes a set of processes for migrating data; and a scheduling system for scheduling processes associated with each of the plurality of migration systems to provide concurrent operation of the plurality of migration systems.

11 Claims, 3 Drawing Sheets

DATA MIGRATION SYSTEM AND METHOD

BACKGROUND OF THE INVENTION

1. Technical Field

The present invention relates generally to data migration, and more specifically to a system and method for migrating data using a heterogeneous mix of migration technologies.

2. Related Art

With the advent of EAS (Enterprise Application Solutions) applications such as SAP®, companies have had to deal with ever growing databases that support these applications. In the mid 90's, these databases were typically under 100 GB. However, over time, as more of a company's business has been committed to the application, large customers now have databases measured in terabytes containing ten's of thousands of tables.

With such large databases come certain challenges. For instance, when a company upgrades its hardware, the re-hosting (i.e., migration) of these large databases to a new machine architecture may be required. However, most of these systems are operating 24 hours each day, seven days per week (24×7). Therefore, in order to successfully rehost large-scale databases, a method of minimizing the outage during the migration is required. Prior to this invention, the overall migration speeds for migrating a database were generally around or below 20 GB/hr, which results in a substantial downtime and cost. The costs associated with such an extended outage are a major factor faced by companies when decided whether to do such a rehost.

There are several existing "methodologies" that have been historically used to re-host or migrate a database. The two primary techniques for migration are unload/load and export/import, which are described below with reference to FIGS. 1 and 2. Unfortunately, because most Very Large Databases (VLDs) are asymmetric in nature (i.e., have many different data set characteristics), prior solutions suffer from the fact that one migration technology cannot efficiently transfer the entire database. The result is an unacceptably slow migration rate (GB/hr). The only significant enhancements that have occurred to the current approaches, over the past decade, was to multi-program this single minded approach by breaking up the migration into pieces and running them concurrently.

An example of an unload/load system is shown in FIG. 1. The primary advantage of is that it creates a database independent intermediate set of flat files. This is useful when changing database vendors but not necessarily optimal with respect to performance when re-hosting while not changing the database. In general, all the tables and associated data are unloaded to a database independent flat file format. When this is completed, the user performs an FTP (file transfer protocol) of these flat files to the target system, and then the load process is initiated. This means that while the source system is unloading, the target is idle (and visa versa). As previously indicated, the heretofore enhancement to this process was to do multiple concurrent unloads to multiple flat files, then FTP them, and finally, run multiple loads concurrently.

The functionality for performing this multiprocessing approach is provided, for example, by generating control files and using the control files to execute multiple concurrent unloads and loads. However, it is still up to the user to perform such tasks as: execute the FTP at the conclusion of the unload; monitor the success of the various unload and load process; and recovery manually from any failures (and there is almost always some).

This unload/load approach generally performs at under 20 GB/hr. It is also faced with the problem that Very Large Databases (VLDs) tend to have some very asymmetric attributes and properties at the table level. For example, a 1 TB database may have a single table over 100 GB and 15,000 tables under a couple of megabytes. Unload/load is not an optimal solution for a single very large table as each unload/load thread is generally capable of only 1-3 GB/hr.

An example of Export/Import for migrations is shown in FIG. 2 utilizing named pipes. This approach takes advantage of UNIX® named pipes (a first in first out "FIFO" buffering system that appears to the application as if the pipe were just a file). Export/Import also uses the innate capabilities of the database to support network connections. Both the export and import run on the target system. The export requests data from the database over the network and "writes" it to the named pipe as if it were a flat file. The import reads from the named pipe as if it was a flat file and loads the database with the resulting data.

Export/Import has an advantage over the Unload/Load method in that "overlap" occurs in the reading and writing operations. The exports do not need to be completed prior to starting the import process because they are both running at the same time. This overlapping can achieve rates of 6-8 GB/hr per thread, and when possibly could achieve overall migration rates around 30 GB/hr.

Unfortunately, because this approach is table specific, it becomes complicated to set up, schedule, and manage the processing of large numbers of tables (e.g., greater than 20,000). Furthermore, it is not a supported methodology for SAP systems, which tend to have the largest databases that need re-hosting.

Accordingly, a need exists for a system that can provide an automated data migration environment and achieve a very high data transfer rate.

SUMMARY OF THE INVENTION

Unlike the prior art, the present invention provides for the management of multiple types of migration technologies to be running concurrently against one source and one target database. It also allows for the implementation of processes that have not been used for migrations prior to now for various reasons, including the complexity in process management, restrictions such as limits to table and field types, etc. This invention allows for using the best migration technique, on a table-by-table basis, while managing and monitoring the entire migration/re-hosting process. In accordance with the present invention, the migration solution used for re-hosting is not limited to a single technology for the entire database.

In a first aspect, the present invention provides a system for migrating data from a source system to a target system, comprising: a plurality of migration systems, wherein each migration system includes a set of processes for migrating data; and a scheduling system for scheduling processes associated with each of the plurality of migration systems to provide concurrent operation of the plurality of migration systems.

In a second aspect, the invention provides a program product stored on a recordable medium for facilitating the migration of data from a source system to a target system using a plurality of heterogeneous migration systems, comprising: a system for scheduling processes associated with each of the plurality of heterogeneous migration systems to allow concurrent use of the plurality of heterogeneous migration systems; and a system that monitors processes associated with each of the plurality of heterogeneous migration systems.

In a third aspect, the invention provides a method for migrating data from a source system to a target system using a plurality of heterogeneous migration systems, comprising: characterizing data sets in the source system; selecting a first migration system to transfer a first data set based on a characteristic of the first data set; selecting a second migration system to transfer a second data set based on a characteristic of the second data set; and concurrently running the first and second migration systems to concurrently transfer the first and second data set to the target system.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
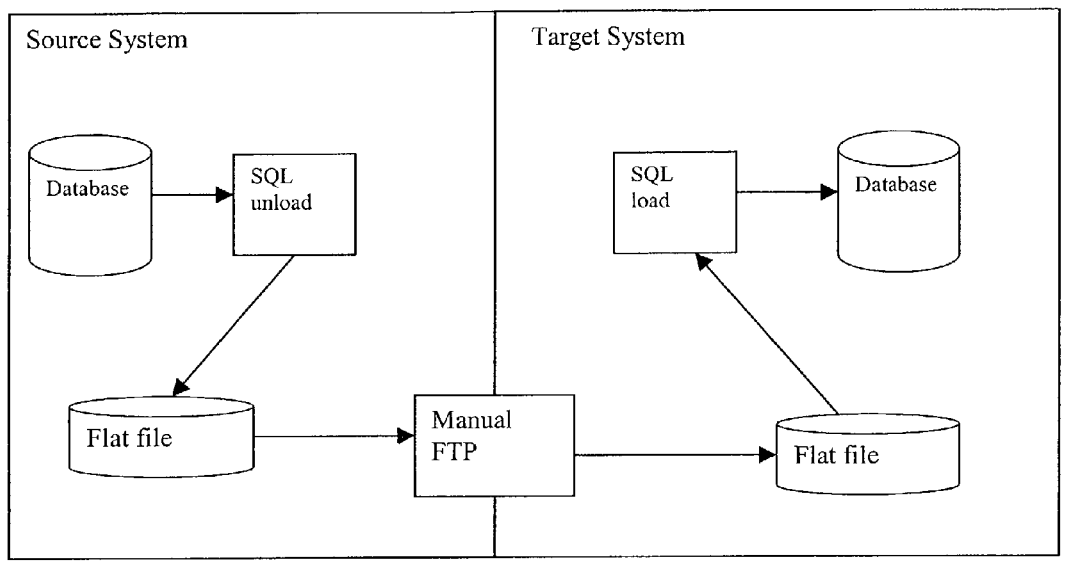
FIG. 1 depicts an unload/load migration system.
Figure 2:
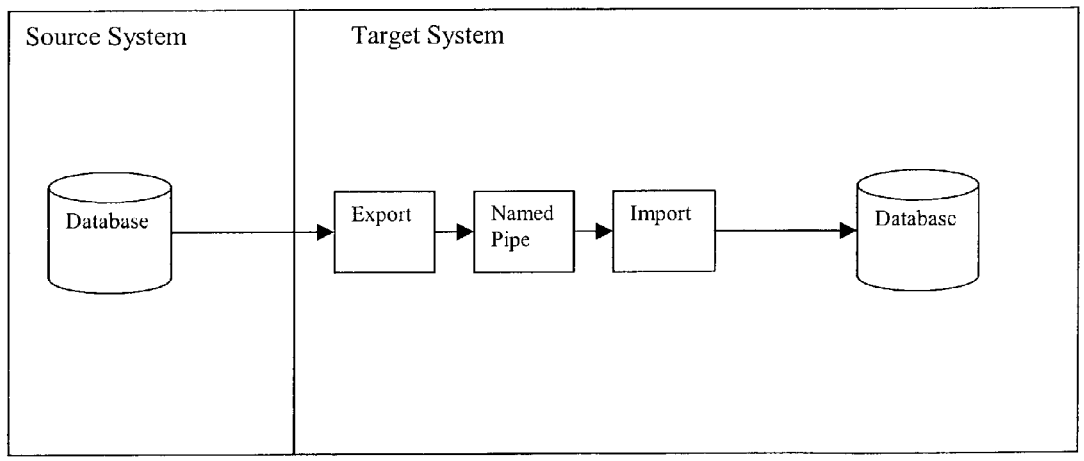
FIG. 2 depicts an export/import with named pipe.
Figure 3:
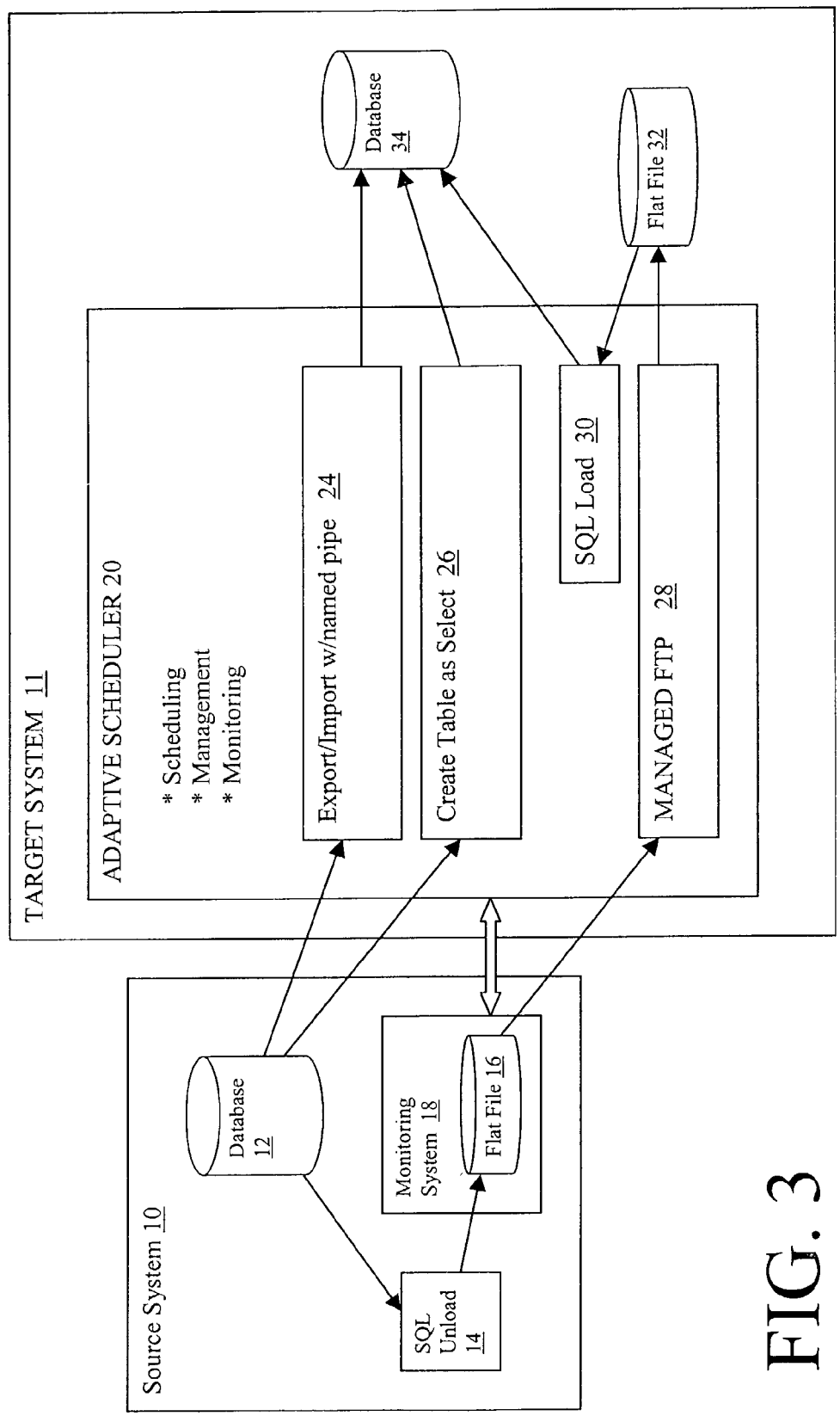
FIG. 3 depicts a system for migrating data from a source system to a target system in accordance with the present invention.

Referring now to, FIG. 3, an exemplary embodiment for migrating data from a source system 10 to a target system 11 is shown using a set of heterogeneous migration systems. In the exemplary embodiment, data from database 12 on source system 10 is rehosted or migrated to database 34 on target system 11 using heterogeneous migration systems, including: (1) an export/import system 24; (2) a create table as select system 26, and (3) an unload/load system using managed FTP 28. It should be understood that the migration systems described herein are for exemplary purposes only, and different migration systems could be used with departing from the scope of the invention.

An adaptive scheduler 20 is provided at the target system 11 to schedule, manage and monitor 22 the processes associated with migrating data using the heterogeneous migration systems 24, 26, 28 ("migration systems"). In the case of the unload/load system using managed FTP 28, data is read out of a source database 12 and into a flat file 16 using an SQL unload process 14. A monitoring system 18 is provided at the source system 10 to monitor the status of the unload process 14. When the monitoring system 18 detects the completion of an "unload" for a predetermined amount of data, e.g., a group of N tables, the adaptive scheduler 20 is notified, and an FTP is initiated for the group of tables. In this manner, data can be efficiency broken up and managed as multiple discrete processes for transfer, rather than waiting until the entire database is unloaded before a transfer is initiated. Once a group of tables has finished being transferred to a second flat file 32 in the target system 11, an SQL load process 30 can be put into the scheduling queue for transferring the group of files to the target database 34.

Adaptive scheduler 20 likewise handles the processes associated with the export/import system 24 and create table as select system 26. The export/import system 24 operates in a manner as described above with the adaptive scheduler providing automated scheduling, management, and monitoring for export/import processes. The create table as select ("CTAS") system 26 involves, for example, the use of the ORACLE® "CREATE TABLE . . . AS SELECT . . . NOLOGGING" statement, run on the target system 11 to select data from the source system 10 through a database link. Indexes are created as a post process step following the successful transfer of data. Historically, this technique was used to clone parts of tables for application testing. It nonetheless provides very fast transfer rates using different memory elements than the unload/load system 28 or export/import system 24. The CTAS system 26 is however limited to certain table types due to restrictions at the field level and therefore cannot be used across an entire database. In particular, this technique does not work for tables containing RAW, LONG RAW or LONG VARCHAR fields.

Figure 4:
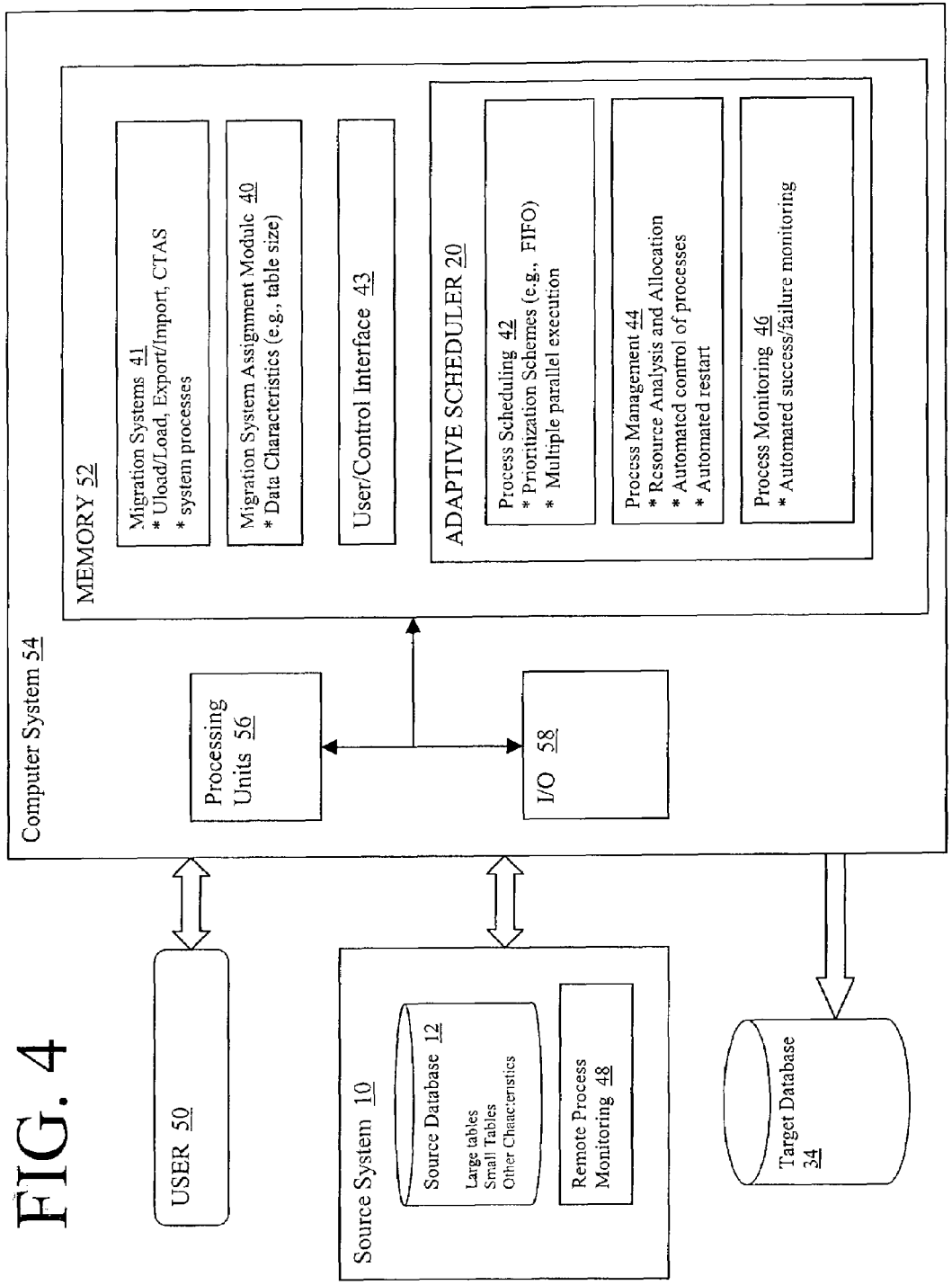
FIG. 4 depicts a computer system having an adaptive scheduler in accordance with the present invention.

Referring now to FIG. 4, the invention is shown embodied in a computer system 54 that generally comprises processing units 56, memory 52, and an input/output (I/O) interfaces 58. As shown, computer system 54 is part of the target system 11 described heretofore. However, it should be understood that computer system 54 could reside separately between the source and target systems. It is understood that although not shown, source system 10 typically contains components (e.g., CPU, memory, etc.) similar to computer system 54. Such components have not been separately depicted or described for brevity purposes. In addition, it is understood that computer system 54 and source system 10 may comprise any type of device capable of accepting input, providing output, and/or communicating with another device.

Communications can occur via one or more direct hard-wired connections (e.g., serial port), or via an addressable connection in a client-server (or server-server) environment, which may utilize any combination of wireline and/or wireless transmission methods. In the case of the latter, the server and client may be connected via the Internet, a wide area network (WAN), a local area network (LAN), a virtual private network (VPN), or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol.

Computer system 54 can comprise any general purpose or specific-use system utilizing standard operating system software, which is designed to drive the operation of the particular hardware and which is compatible with other system components and I/O controllers. Processing units 56 may comprise a single processing unit, multiple processing units capable of parallel operation, or be distributed across one or more processing units in one or more locations, e.g., on a client and server. Memory 52 may comprise any known type of data storage and/or transmission media, including magnetic media, optical media, random access memory (RAM), read-only memory (ROM), a data cache, a data object, etc. Moreover, memory 52 may reside at a single physical location, comprising one or more types of data storage, or be distributed across a plurality of physical systems in various forms.

I/O interface 58 may comprise any system for exchanging information with one or more I/O devices, including an I/O port (serial, parallel, ethernet, keyboard, mouse, etc.), a universal serial bus (USB) port, expansion bus, integrated drive electronics (IDE), etc. I/O devices may comprise any known type of input/output device capable of communicating with I/O interfaces 58 with or without additional devices (e.g., expansion cards), including a network system, a modem, speakers, a monitor (cathode-ray tube (CRT), liquid-crystal display (LCD), etc.), hand-held device, keyboard, mouse, voice recognition system, speech output system, scanner, printer, facsimile, pager, storage devices, etc. In addition, although not shown, additional components, such as a system bus, cache memory, communication systems, system software, etc., may be incorporated into computer system 54. The databases of the current invention may also include one or more storage devices, such as a magnetic disk drive or an optical disk drive. Further, they can be configured to include data distributed across, for example, a LAN, WAN or a storage area network (SAN) (not shown).

Shown in memory 52 as various computer program products are the migration systems 41 (described above), a migration system assignment module 40, a user/command interface 43, and adaptive scheduler 20. Migration system assignment module 40 provides a framework in which data sets (e.g., tables) in the source database 12 can be examined to determine the best migration system to handle each of the data sets. Namely, characteristics from each table in the source database 12 are examined and migration systems 41 are assigned based on the characterizations. The results may be coded into one or more command files that can be read by adaptive scheduler 20. In one embodiment, tables from the source database are characterized based on size. Larger tables are then assigned to a first migration tool (e.g., export/import), while smaller, more numerous tables are assigned to a second migration tool (e.g., unload/load). In a further aspect, data tables that do not include restricted fields may be assigned to a third migration tool (e.g., CTAS). Obviously, the actual selection/assignment criteria of migration systems could be implemented in any manner without departing from the scope of the invention. Moreover, a user 50, via user/command interface 43, could manually assign data sets to migration tools, for instance using a command file.

Once the assignments are made, adaptive scheduler 20 can be implemented to effectuate transfer of the data from source database 12 to target database 34 using the migration systems 41. Adaptive scheduler 20 includes various systems for facilitating the transfer, including process scheduling 42, process management 44, and process monitoring 46. Some or all of these systems may also run on the source system 10. Process scheduling 42 provides the prioritization schemes for scheduling the ongoing processes associated with each of the migration systems 41. Scheduling can be implemented in any manner. In one embodiment, processes are scheduled on a first in first out (FIFO) basis. In another embodiment, the user 50 can manually select and assign priorities via user/command interface 43. Because processes from different migration systems can be scheduled in one comprehensive place, process scheduling 42 allows multiple parallel execution of processes from different migration systems 41.

In a more detailed exemplary embodiment, prioritization is set during the initialization of the scheduler 20 by reading the directory containing a set of structure files. The priority is the order in which the files were placed into this directory, which is determined during a database structure analysis and split process. The adaptive scheduler 20 may be implemented to recognize and handle structure files using file name extensions, such as:

<name>.STR sql unload/ftp/sql load
<name>.ORA export/import (implies a separate index build process)
<name>.CTS create table as select (implies a separate index build process)

The reading of these files causes each to be assigned a number 1 to n for prioritization with a process queue. Each queue also has a priority, with the default ordering 1) ORA, 2) CTS, 3) STR and 4) Index Builds. This order can be changed. When the scheduler 20 wakes up, either from a task completion or a timer pop, the highest priority runnable process is then selected for execution.

Index processes have a user selectable priority mechanism. The options are:

| | |
|---|---|
| INDEXPRI=NONE | FIFO Index Execution Queue |
| INDEXPRI=PRTY | Index execution Queue ordered by transfer priority |
| INDEXPRI=DEGREE | Index execution Queue ordered by degree of index build parallelism |

Process management 44 manages and controls the execution of processes in an automated manner to maximize efficiency. For instance, process management 44 may analyze the resources of computer system 54, and make allocation decisions for scheduled processes based on those resources. Process management 44 also automates control of the different processes to allow the different migration systems 41 to concurrently operate in an efficient manner.

Process monitoring 46 provides comprehensive monitoring of processes from each of the different migration systems 41 as they are executed. For example, process monitoring may monitor for successes/completions and failures/errors, and then cause process management 44 to automatically initiate a recovery and restart operation for failed processes. In addition, a remote process monitoring system 48 may be run on the source system to, e.g., determine when a group of tables have been unloaded.

Adaptive scheduler 20 may utilize a command line interface consistent with most UNIX system administrator tools. The command interface may, for example, provide the following facilities:

Restart a failing CTAS, Export/Import or SQL Unload/Reload process;

Restart a failing Index build process;

Change the priority of a process;

Adjust the task execution levels, i.e., control the total number of tasks, the number of tasks for each of the types of data transfer and the number of index build tasks; and Adjust various other execution parameters.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A system for migrating data from a source system to a target system, comprising:
   a processor, and
   a memory, the memory having:
   a plurality of migration systems, wherein each migration system includes a set of processes for migrating data; and
   a scheduling system for scheduling processes associated with each of the plurality of migration systems to provide concurrent operation of the plurality of migration systems to migrate multiple portions of the data having identical initial formats,
   wherein the plurality of migration systems include an SQL upload/download system,
   wherein the SQL upload/download system includes an SQL unload process for unloading data from the source system to a first flat file within the source system, and wherein the first flat file is monitored by a monitoring system that is in communication with the scheduling system, and
   wherein the scheduling system causes an FTP transfer to occur from the first flat file to a second flat file on the target system when the monitoring system detects that a predetermined amount of data has been uploaded to the first flat file.

2. The system of claim 1, wherein the scheduling system schedules an SQL load from the second flat file to a target database after the predetermined amount of data has been transferred to the second flat file.

3. The system of claim 1, wherein the predetermined amount of data comprises a group of tables.

4. The system of claim 1, wherein the plurality of migration systems includes an export/import system that uses named pipes to migrate data.

5. The system of claim 1, wherein the plurality of migration systems includes a create table as select system for migrating tables that do not include a predetermined restriction.

6. The system of claim 1, wherein the source system includes a source database having a plurality of tables, and wherein the scheduler assigns a migration system for each table based on at least one characteristic of the table.

7. The system of claim 6, wherein the at least one characteristic of the table is a size of the table.

8. The system of claim 1, wherein the scheduler includes a monitoring system that comprehensively monitors for errors and process completions for processes associated with each of the plurality of migration systems.

9. The system of claim 1, wherein the scheduler sets a priority for each process for each of the plurality of migration systems.

10. The system of claim 1, wherein the scheduler identifies failed processes and initiates a recovery and restart operation for failed processes.

11. The system of claim 1, wherein the scheduler tracks the number of processes running to manage resources for the target system.

* * * * *